(12) United States Patent
Heaton et al.

(10) Patent No.: US 11,989,698 B2
(45) Date of Patent: May 21, 2024

(54) VEHICLE MEETINGS

(71) Applicant: Ford Global Technologies, LLC, Dearborn, MI (US)

(72) Inventors: James Wilhelm Heaton, Saline, MI (US); Venkata Maruthe Ravikumara Sharma Chengalvala, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 17/712,623

(22) Filed: Apr. 4, 2022

(65) Prior Publication Data

US 2023/0316235 A1 Oct. 5, 2023

(51) Int. Cl.
*G06Q 10/1093* (2023.01)
*B60W 40/09* (2012.01)
*G06V 20/59* (2022.01)

(52) U.S. Cl.
CPC ......... *G06Q 10/1095* (2013.01); *B60W 40/09* (2013.01); *G06V 20/593* (2022.01); *B60W 2540/01* (2020.02); *B60W 2540/229* (2020.02)

(58) Field of Classification Search
CPC ........ G06Q 10/00–50/00; G06V 10/00–40/00; B60W 10/00–2756/00
USPC .................................................. 705/7.11–7.42
See application file for complete search history.

(56) References Cited

U.S. PATENT DOCUMENTS

| | | | |
|---|---|---|---|
| 9,207,093 B2 | 12/2015 | Barrett et al. | |
| 9,232,069 B2* | 1/2016 | Barrett | H04W 4/48 |
| 9,282,286 B2* | 3/2016 | Chauhan | B60R 1/00 |
| 9,820,108 B1 | 11/2017 | Inciong et al. | |
| 10,837,790 B2* | 11/2020 | Singhal | G01C 21/3407 |
| 11,025,862 B1* | 6/2021 | Lee | H04N 7/142 |
| 11,044,283 B2 | 6/2021 | Nelson et al. | |
| 2008/0120373 A1* | 5/2008 | Donovan | H04L 67/12 709/204 |
| 2009/0240397 A1* | 9/2009 | Schofield | B60R 1/12 701/36 |
| 2012/0254763 A1* | 10/2012 | Protopapas | G06Q 10/109 715/738 |
| 2015/0056970 A1* | 2/2015 | Barrett | H04W 4/16 455/416 |
| 2015/0163066 A1* | 6/2015 | DeRosa | H04L 65/403 370/261 |
| 2015/0256795 A1* | 9/2015 | Chauhan | H04L 67/12 348/14.02 |

(Continued)

FOREIGN PATENT DOCUMENTS

JP 20216801 A 1/2021

*Primary Examiner* — Alan S Miller
(74) *Attorney, Agent, or Firm* — Brandon Hicks; Bejin Bieneman PLC

(57) ABSTRACT

A computer includes a processor and a memory, and the memory stores instructions executable by the processor to provide an identification of an occupant of a vehicle to a plurality of virtual-meeting platforms, receive data indicating a plurality of virtual meetings at respective start times for the occupant from the virtual-meeting platforms, connect a user interface of the vehicle to a first one of the virtual meetings through a first virtual-meeting platform of the virtual meeting platforms at the respective start time, and connect the user interface to a second one of the virtual meetings through a second virtual-meeting platform of the virtual meeting platforms at the respective start time.

20 Claims, 4 Drawing Sheets

(56) References Cited

U.S. PATENT DOCUMENTS

| | | | | |
|---|---|---|---|---|
| 2016/0277242 | A1* | 9/2016 | Sallam | H04L 12/1831 |
| 2018/0046957 | A1* | 2/2018 | Yaari | G06Q 10/1095 |
| 2018/0090154 | A1* | 3/2018 | Aaron | H04L 12/1827 |
| 2018/0137470 | A1* | 5/2018 | Donnelly | H04W 4/44 |
| 2023/0082825 | A1* | 3/2023 | Gerrese | G06Q 10/06314 |
| | | | | 705/7.19 |

* cited by examiner

VEHICLE MEETINGS

BACKGROUND

Virtual-meeting platforms host virtual meetings, i.e., meetings that occur online, generally with attendees from disparate physical locations. In a virtual meeting, the virtual-meeting platform transmits audio and video of various devices to other devices in the meeting.

DETAILED DESCRIPTION

Figure 1:
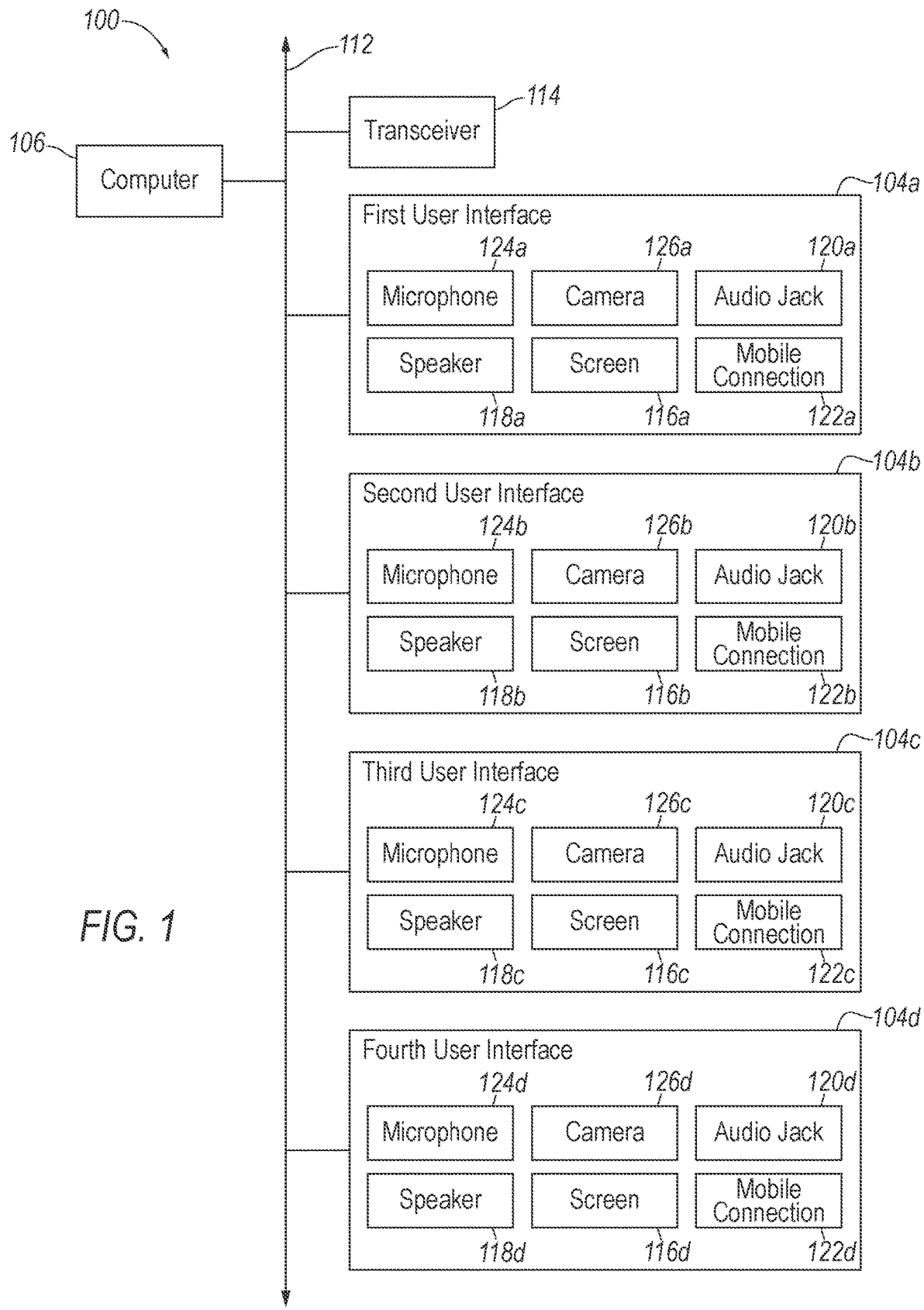
FIG. 1 is a block diagram of an example vehicle.

This disclosure describes an in-vehicle system for managing data about and in virtual meetings by interacting with multiple virtual-meeting platforms. The system can provide for an occupant of the vehicle to connect to the virtual meetings through the virtual-meeting platforms in an efficient and nondistracting manner. The system can include one or more user interfaces of the vehicle and a computer communicatively coupled to the user interfaces. The computer is programmed to identify an occupant of the vehicle, provide an identification of the occupant to a plurality of virtual-meeting platforms, receive data indicating a plurality of virtual meetings at respective start times for the occupant from the virtual-meeting platforms, and connect one of the user interfaces to the respective virtual meetings through the respective virtual-meeting platforms at the respective start times. The vehicle can include multiple user interfaces, and the foregoing can be implemented independently for different occupants through the different user interfaces. The system can thus manage data from the multiple virtual-meeting platforms for the occupants of the vehicle.

A computer includes a processor and a memory, and the memory stores instructions executable by the processor to provide an identification of an occupant of a vehicle to a plurality of virtual-meeting platforms, receive data indicating a plurality of virtual meetings at respective start times for the occupant from the virtual-meeting platforms, connect a user interface of the vehicle to a first one of the virtual meetings through a first virtual-meeting platform of the virtual meeting platforms at the respective start time, and connect the user interface to a second one of the virtual meetings through a second virtual-meeting platform of the virtual meeting platforms at the respective start time.

The occupant may be a first occupant, the identification may be a first identification, and the instructions may further include instructions to identify a second occupant of the vehicle and provide a second identification of the second occupant to the virtual-meeting platforms. The virtual meetings may be first virtual meetings, the start times may be first start times, and the instructions may further include to receive data indicating a plurality of second virtual meetings at respective second start times for the occupant from the virtual-meeting platforms. The user interface may be a first user interface, and the instructions may include instructions to connect a second user interface of the vehicle to a first one of the second virtual meetings through the first virtual-meeting platform at the respective second start time connect the second user interface to a second one of the second virtual meetings through the second virtual-meeting platform at the respective second start time. The user interface may be a first user interface, and the instructions may include instructions to connect a second user interface of the vehicle to a first one of the second virtual meetings through the first virtual-meeting platform at the respective second start time and connect the second user interface to a second one of the second virtual meetings through the second virtual-meeting platform at the respective second start time. The first one of the first virtual meetings and the first one of the second virtual meetings may be different. A first scheduled interval of the first one of the first virtual meetings may overlap a second scheduled interval of the first one of the second virtual meetings.

The first one of the first virtual meetings and the first one of the second virtual meetings may be the same. The instructions may further include instructions to, upon connecting the first user interface to the first one of the first virtual meetings, provide a first session identifier of the first user interface for the first one of the first virtual meetings; and upon connecting the second user interface to the first one of the second virtual meetings, provide a second session identifier of the second user interface for the first one of the second virtual meetings, and the first and second session identifiers may be different.

The instructions may further include instructions to, in response to the user interface being connected to the first one of the virtual meetings at the start time of a third one of the virtual meetings, disconnect the user interface from the first one of the virtual meetings, and then connect the user interface to the third one of the virtual meetings.

The instructions may further include instructions to, in response to the user interface being connected to the first one of the virtual meetings at the start time of a third one of the virtual meetings, transmit a notification to the third one of the virtual meetings.

The instructions may further include instructions to receive a selection of a first option or a second option; in response to the user interface being connected to the first one of the virtual meetings at the start time of a third one of the virtual meetings, based on the selection being the first option, disconnect the user interface from the first one of the virtual meetings, and then connect the user interface to the third one of the virtual meetings; and in response to the user interface being connected to the first one of the virtual meetings at the start time of the third one of the virtual meetings, based on the selection being the second option, transmit a notification to the third one of the virtual meetings.

A system includes a user interface of a vehicle and a computer communicatively coupled to the user interface. The computer is programmed to provide an identification of an occupant of the vehicle to a plurality of virtual-meeting platforms, receive data indicating a plurality of virtual meetings at respective start times for the occupant from the virtual-meeting platforms, connect the user interface to a first one of the virtual meetings through a first virtual-meeting platform of the virtual meeting platforms at the respective start time, and connect the user interface to a second one of the virtual meetings through a second virtual-meeting platform of the virtual meeting platforms at the respective start time.

The user interface may include a microphone and a speaker.

The user interface may include an audio jack.

The user interface may include a camera.

The user interface may include a mobile connection connectable to a mobile device of the occupant.

The user interface may be a first user interface, the occupant may be a first occupant, the identification may be a first identification, the system may further include a second user interface, the computer may be further programmed to identify a second occupant of the vehicle and provide a second identification of the second occupant to the virtual-meeting platforms, and the second user interface may be associated with the second occupant. The first user interface may include a first microphone and a first speaker, and the second user interface may include a second microphone and a second speaker.

The first user interface may be arranged for the first occupant to be in a front seat of the vehicle, and the second user interface may be arranged for the second occupant to be in a rear seat of the vehicle.

A method includes providing an identification of an occupant of a vehicle to a plurality of virtual-meeting platforms, receiving data indicating a plurality of virtual meetings at respective start times for the occupant from the virtual-meeting platforms, connecting a user interface of the vehicle to a first one of the virtual meetings through a first virtual-meeting platform of the virtual meeting platforms at the respective start time, and connecting the user interface to a second one of the virtual meetings through a second virtual-meeting platform of the virtual meeting platforms at the respective start time.

With reference to the Figures, wherein like numerals indicate like parts throughout the several views, a system 102 includes at least one user interface 104 of a vehicle 100 and a computer 106 communicatively coupled to the user interface 104. The computer 106 is programmed to provide an identification of an occupant of the vehicle 100 to a plurality of virtual-meeting platforms 110, receive data indicating a plurality of virtual meetings 108 at respective start times for the occupant from the virtual-meeting platforms 110, connect one user interface 104 to a first one of the virtual meetings 108 through a first virtual-meeting platform 110 of the virtual meeting 108 platforms at the respective start time, and connect the one user interface 104 to a second one of the virtual meetings 108 through a second virtual-meeting platform 110 of the virtual meeting 108 platforms at the respective start time.

With reference to FIG. 1, the vehicle 100 may be any passenger or commercial automobile such as a car, a truck, a sport utility vehicle, a crossover, a van, a minivan, a taxi, a bus, etc.

The system 102 includes the computer 106. The computer 106 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 106 can thus include a processor, a memory, etc. The memory of the computer 106 can include media for storing instructions executable by the processor as well as for electronically storing data and/or databases, and/or the computer 106 can include structures such as the foregoing by which programming is provided. The computer 106 can be multiple computers coupled together.

The system 102 can include a communications network 112 such as a controller area network (CAN) bus, Ethernet, WiFi, Local Interconnect Network (LIN), onboard diagnostics connector (OBD-II), and/or any other wired or wireless communications network. The computer 106 may transmit and receive data through the communications network 112. The computer 106 may be communicatively coupled to a transceiver 114, the user interfaces 104, and other components via the communications network 112.

The system 102 can include the transceiver 114. The transceiver 114 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. Communication over a network to which the transceiver 114 connects can use any suitable network protocol, e.g., real-time streaming protocol (RTSP), mobile process group (MPG) routing protocol, MQTT, hypertext transfer protocol (http or https), etc. The transceiver 114 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, one of the virtual-meeting platforms 110, a manufacturer or fleet operator of the vehicle 100 hosting one of the virtual-meeting platforms 110, a mobile device associated with one of the occupants of the vehicle 100, etc. The transceiver 114 may be one device or may include a separate transmitter and receiver.

The system 102 includes a plurality of the user interfaces 104, e.g., four user interfaces 104a-d. Each user interface 104 presents information to and receives information from one of the occupants of the vehicle 100. Each user interface 104 may include dials, digital readouts, a screen 116, a speaker 118, an audio jack 120, a mobile connection 122, and so on for providing information to the occupant, e.g., human-machine interface (HMI) elements such as are known. Each user interface 104 may include buttons, knobs, keypads, a microphone 124, a camera 126, the audio jack 120, the mobile connection 122, and so on for receiving information from the occupant.

The microphones 124 are transducers that convert sound to an electrical signal. The microphones 124 can be any suitable type, e.g., a dynamic microphone, which includes a coil of wire suspended in a magnetic field; a condenser microphone, which uses a vibrating diaphragm as a capacitor plate; a contact microphone, which uses a piezoelectric crystal; etc.

The speakers 118 are electroacoustic transducers that convert an electrical signal into sound. The speakers 118 can be any suitable type for producing sound audible to the respective occupant, e.g., dynamic.

The cameras 126 can detect electromagnetic radiation in some range of wavelengths. For example, the cameras 126 may detect visible light, infrared radiation, ultraviolet light, or some range of wavelengths including visible, infrared, and/or ultraviolet light. For example, the cameras 126 can be charge-coupled devices (CCD), complementary metal oxide semiconductors (CMOS), or any other suitable type.

The screens 116 can be any suitable type for displaying content legible to the respective occupants, e.g., light-emitting diode (LED), organic light-emitting diode (OLED), liquid crystal display (LCD), plasma, digital light processing technology (DLPT), etc.

The audio jacks 120 are sockets for transmitting analog audio signals, e.g., into which headphones or headsets of the occupants can be plugged.

The mobile connection 122 is connectable to a mobile device of an occupant to transfer data between the computer 106 and the mobile device. The mobile connection 122 can be a port for a wired connection, e.g., an auxiliary connection plugged into the mobile device and into the vehicle 100, e.g., an instrument panel 136. The mobile connection 122 can be a transceiver for a wireless connection, e.g., wireless local area connection such as Wi-Fi (described in the IEEE 802.11 standards), BLUETOOTH Low Energy (BLE), or UWB. The mobile connection 122 may be via the transceiver 114.

Figure 2:
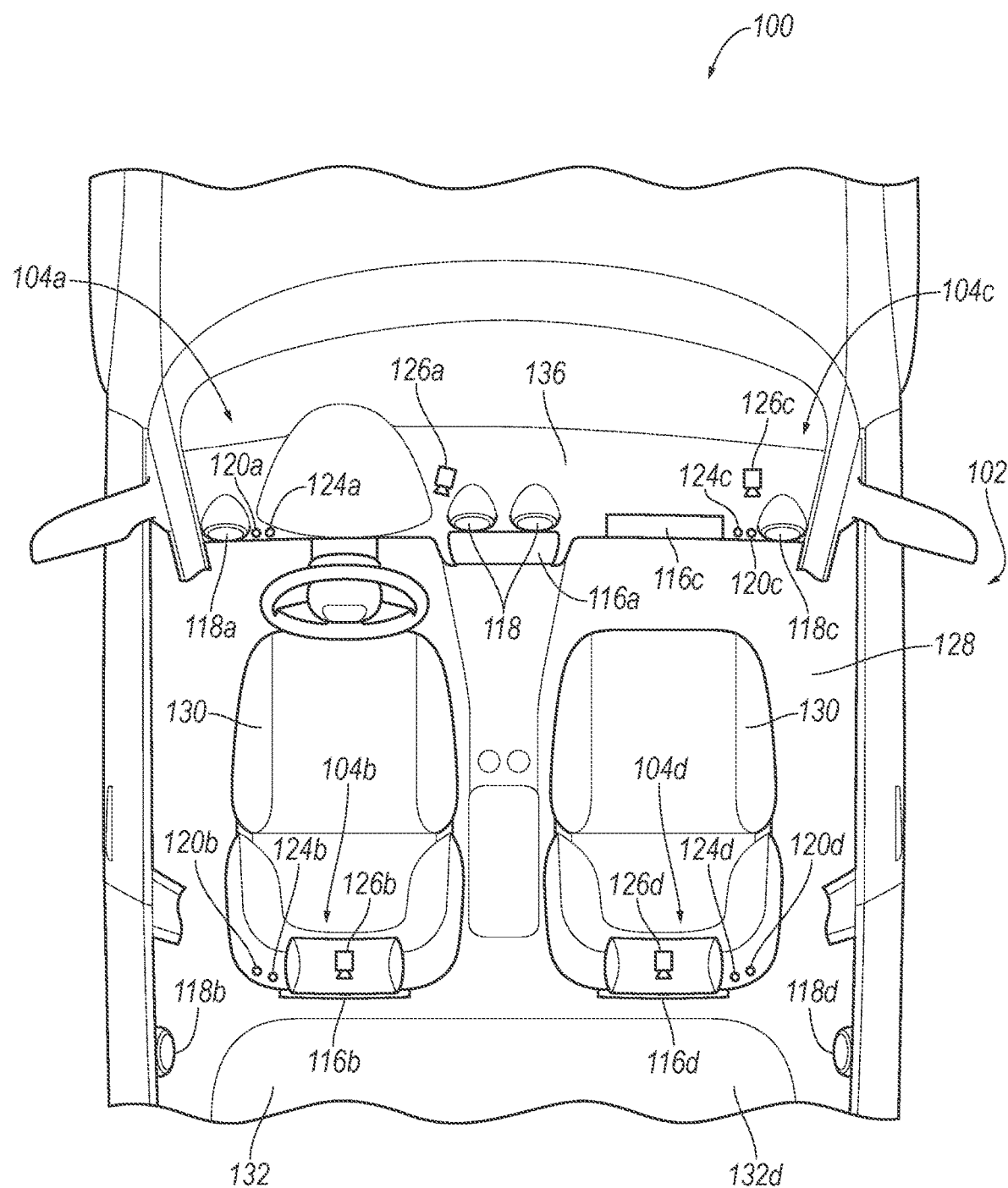
FIG. 2 is a top view of the vehicle with a roof removed for illustration.

With reference to FIG. 2, the vehicle 100 includes a passenger cabin 128 to house the occupants of the vehicle 100. The passenger cabin 128 includes one or more front seats 130 disposed at a front of the passenger cabin 128 and one or more rear seats 132 disposed behind the front seats 130. The passenger cabin 128 may also include third-row seats (not shown) at a rear of the passenger cabin 128. In FIG. 2, the front seats 130 are shown to be bucket seats and the rear seats 132 are shown to be bench seats, but the front seats 130 and rear seats 132 may be other types. The position and orientation of the front seats 130 and rear seats 132 and components thereof may be adjustable by the occupants.

The user interfaces 104 are arranged for the respective occupants in the front seats 130 or rear seats 132 to use. For example, the user interfaces 104 can include a first user interface 104a arranged for an occupant in the driver-side front seat 130, a second user interface 104b arranged for an occupant in the driver-side rear seat 132, a third user interface 104c arranged for an occupant in the passenger-side front seat 130, and a fourth user interface 104d arranged for an occupant in the passenger-side rear seat 132. For example, for each user interface 104a-d, the screen 116a-d can be disposed in front of the occupant, the microphone 124a-d can be arranged closer to that occupant than to any of the other occupants, the speakers 118a-d can be arranged to play more loudly for that occupant than for any of the other occupants, the audio jack 120a-d can be within arms-reach of that occupant, and the camera 126a-d can be arranged so that a face of that occupant is in the field of view. For the second and fourth user interfaces 104b,d, the screen 116 can be positioned on rear sides of the front seats 130.

The computer 106 can be programmed to identify the multiple occupants of the vehicle 100. For example, the occupant in the driver-side front seat 130 can use a keyfob or the like to start the vehicle 100, and the keyfob can have an RFID tag or the like uniquely specifying the occupant from among other potential occupants who regularly use the vehicle 100. The RFID signal can be associated with the occupant in memory. For another example, the mobile devices of one or more of the occupants can pair with, e.g., the mobile connections 122a-d of the respective user interfaces 104a-d. The mobile devices can have identifiers such as are known that are detected by or transmitted to the computer 106 and can be associated with the respective occupants in memory. For another example, the computer 106 can use image data from the cameras 126a-d and can identify one or more of the occupants using image-recognition techniques such as are known. For another example, one or more of the occupants can enter identifying information such as a username and password into the respective user interfaces 104a-d. Upon identifying the occupants, the user interfaces 104a-d can be associated with the respective occupants seated in the respective front seats 130 or rear seats 132.

Figure 3:
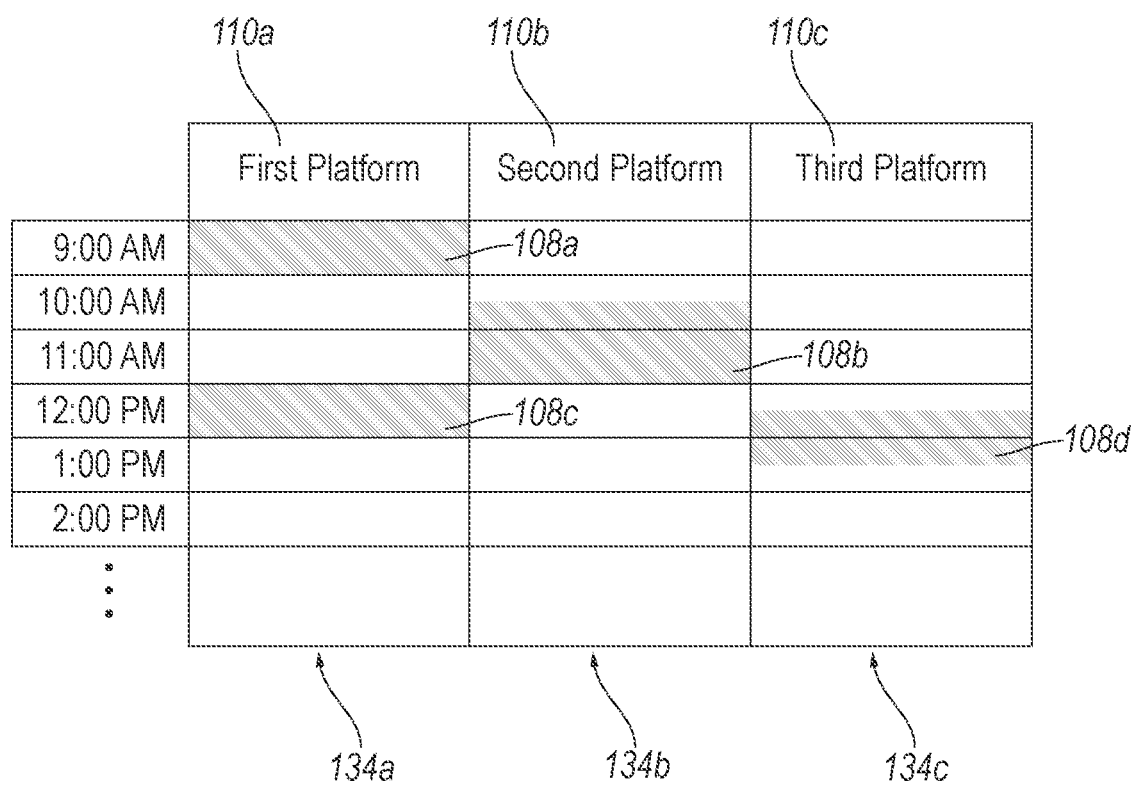
FIG. 3 is a diagram of example calendars from virtual-meeting platforms.

With reference to FIG. 3, the computer 106 can be programmed to communicate with the plurality of virtual-meeting platforms 110, e.g., via the transceiver 114. The virtual-meeting platforms 110 are distinct services offering virtual meetings 108 to their users, e.g., Zoom®, Microsoft Teams®, Google Meet®, Cisco WebEx®, etc. The occupants can each have accounts with one or more of the virtual-meeting platforms 110. For example, the computer 106 can store an application for performing the tasks described below, which an occupant can launch with a selection inputted to the user interface 104.

The computer 106 can be programmed to provide identifications of the occupants to the virtual-meeting platforms 110, e.g., upon identifying the occupants. For example, the computer 106 can store identifying information such as username and password for the accounts that the occupants have with the virtual-meeting platforms 110, and the computer 106 can provide that identifying information to the virtual-meeting platforms 110 for each occupant that the computer 106 identifies.

The computer 106 can be programmed to receive calendars 134, i.e., data indicating a plurality of the virtual meetings 108 at respective start times for the occupants, from the virtual-meeting platforms 110. Each calendar 134 can include data for multiple virtual meetings 108 for one of the occupants hosted by one of the virtual-meeting platforms 110. For example, FIG. 3 shows a first calendar 134a from a first virtual-meeting platform 110a with data for a first virtual meeting 108a and a third virtual meeting 108c, a second calendar 134b from a second virtual-meeting platform 110b with data for a second virtual meeting 108b, and a third calendar 134c from a third virtual-meeting platform 110c with data for a fourth virtual meeting 108d. The data for a virtual meeting 108 can include the start time, an end time, a meeting identifier for the virtual meeting 108, and a session identifier for the occupant that is scheduled to attend the virtual meeting 108. If multiple occupants are scheduled to attend the same virtual meeting 108, the data for the virtual meeting 108 can include unique session identifiers for the occupants attending. The start time and end time for a virtual meeting 108 can define a scheduled interval for that virtual meeting 108. The scheduled intervals for two virtual meetings 108 may be separated in time, e.g., the first and second virtual meetings 108a-b in FIG. 3; may overlap, e.g., the third and fourth virtual meetings 108c-d in FIG. 3; or may be adjacent, i.e., the start time of one of the virtual meetings 108 is the end time of the other virtual meeting 108, e.g., the second and third virtual meetings 108b—c in FIG. 3.

The computer 106 can be programmed to connect the user interfaces 104 to the respective virtual meetings 108 through the respective virtual-meeting platforms 110 at the respective start times. In other words, for each occupant attending a virtual meeting 108, the computer 106 can be programmed to connect the user interface 104 of that occupant to that virtual meeting 108 through the virtual-meeting platform 110 that is hosting that virtual meeting 108 at the start time of that virtual meeting 108, e.g., to the second virtual meeting 108*b* through the second virtual-meeting platform 110*b* at 10:30 AM in FIG. 3. The computer 106 can connect the user interface 104 to the virtual meeting 108 by providing the session identifier of that user interface 104, i.e., the session identifier of the occupant using that user interface 104, and the meeting identifier of that virtual meeting 108 to the virtual-meeting platform 110 that is hosting that virtual meeting 108.

Once a user interface 104 is connected to a virtual meeting 108 through a virtual-meeting platform 110, the occupant using that user interface 104 is able use the user interface 104 to participate in the virtual meeting 108. For example, the screen 116 can display information related to the virtual meeting 108 such as a list of attendees, information shared by other attendees, video of other attendees, etc., or the user interface 104 comprising the mobile connection 122 can output that information to the mobile device of the occupant. The user interface 104 can connect to the virtual meeting 108 with both audio and video, audio only, or video only, according to a setting selected by the occupant. The speaker 118 or the audio jack 120 can play sound recorded from other attendees of the virtual meeting 108, or the mobile connection 122 can output that sound to the mobile device of the occupant. The occupant can speak to the other attendees through the microphone 124, the audio jack 120, or the mobile connection 122 via the mobile device. The camera 126 can record video of the occupant to transmit to the other attendees of the virtual meeting 108. The transceiver 114 can transmit the data between the user interface 104 and the virtual-meeting platform 110. When one user interface 104, e.g., the user interface 104*a*, is connected to a virtual meeting 108, the computer 106 can refrain from receiving input from or providing output to the other user interfaces, e.g., the user interfaces 108*b-d* (unless one of the other user interfaces 108 has joined the same virtual meeting 108), thereby providing privacy for the occupant attending the virtual meeting 108 and reduced distractions for the occupants not attending the virtual meeting 108.

The computer 106 can be programmed to connect multiple user interfaces 104*a-d* to meetings at once. For example, the computer 106 can be programmed to connect the user interfaces 104*a-d* to different virtual meetings 108 at the same time, i.e., to different virtual meetings 108 with overlapping scheduled intervals, e.g., the first user interface 104*a* to a first virtual meeting 108 and the second user interface 104*b* to a second virtual meeting 108. The first and second virtual meetings 108 can be hosted by the same virtual-meeting platform 110 or different virtual-meeting platforms 110. The computer 106 can route data received with the meeting identifier for the first virtual meeting 108 and the session identifier for the first user interface 104*a* to the first user interface 104*a*, and the computer 106 can route data received with the meeting identifier for the second virtual meeting 108 and the session identifier for the second user interface 104*b* to the second user interface 104*b*.

For another example, the computer 106 can be programmed to connect two or more of the user interfaces 104*a-d* to the same virtual meeting 108, e.g., the first user interface 104*a* and the second user interface 104*b* to the same virtual meeting 108. Even though the first user interface 104*a* and the second user interface 104*b* are connected to the same virtual meeting 108, the user interfaces 104*a-b* are associated with accounts for different occupants and are assigned different session identifiers. The computer 106 can route data received with the meeting identifier for the virtual meeting 108 and the session identifier for the first user interface 104*a* to the first user interface 104*a*, and the computer 106 can route data received with the meeting identifier for the virtual meeting 108 and the session identifier for the second user interface 104*b* to the second user interface 104*b*.

The computer 106 can be programmed to disconnect one of the user interfaces 104 from a virtual meeting 108 to which the user interface 104 is currently connected. The computer 106 can transmit a notification to the virtual meeting 108 that the occupant using that user interface 104 is leaving the virtual meeting 108, and the computer 106 can cease receiving and transmitting data related to that virtual meeting 108. For example, the computer 106 can be programmed to disconnect the user interface 104 from the virtual meeting 108 in response to receiving a command from the occupant entered into the user interface 104 to disconnect from the virtual meeting 108. For another example, the computer 106 can be programmed to disconnect the user interface 104 from the virtual meeting 108 in response to another virtual meeting 108 starting, as will be described below.

The computer 106 can be programmed to instruct one of the virtual-meeting platforms 110 to perform operations built into that virtual-meeting platform 110 during a virtual meeting 108 in response to receiving a command from the occupant entered into the user interface 104 to perform the operation. Available operations can be provided by the virtual-meeting platform 110 hosting the virtual meeting 108, and the operations can be different between different virtual-meeting platforms 110. Examples of operations include sharing content, muting and unmuting the microphone 124, turning video from the camera 126 on and off, route messaging, changing display settings for what is shown on the screen 116, etc.

In response to one of the user interfaces 104 being connected to a virtual meeting 108 (referred to herein for convenience as an "old" virtual meeting) at the start time of another virtual meeting 108 (referred to for convenience as a "new" virtual meeting 108) for that user interface 104, the computer 106 can switch the connection of the user interface 104 to the new virtual meeting 108 and/or keep the user interface 104 connected to the old virtual meeting 108, according to a selection by an occupant through the user interface 104. The virtual meetings 108 can be adjacent to each other, i.e., the start time of the new virtual meeting 108 matches the end time of the old virtual meeting 108, e.g., the second and third virtual meetings 108*b—c* in FIG. 3; or can have overlapping scheduled intervals, i.e., the start time of the new virtual meeting 108 is earlier than the end time of the old virtual meeting 108, e.g., the third and fourth virtual meetings 108*c-d*. The computer 106 can be programmed to receive the selection of a first option, a second option, or a third option, e.g., via the user interface 104. The first option can be switching virtual meetings 108, the second option can be staying in the first virtual meeting 108, and the third option can be connecting to both virtual meetings 108 simultaneously. For example, the computer 106 can receive the selection in advance of the virtual meetings 108, e.g., as a setting stored in a profile of the occupant. For another example, the user interface 104 can prompt the occupant to make the selection in response to the user interface 104 being connected to one virtual meeting 108 at the start time of another virtual meeting 108 and then receive the selection by the occupant.

The computer 106 can be programmed to, in response to the user interface 104 being connected to the one virtual meeting 108 at the start time of another virtual meeting 108, based on the selection being the first option, disconnect the user interface 104 from the old virtual meeting 108 and then connect the user interface 104 to the new virtual meeting 108, e.g., disconnect from the second virtual meeting 108b and then connect to the third virtual meeting 108c in FIG. 3. The computer 106 can transmit a notification to the old virtual meeting 108 (e.g., second virtual meeting 108b) indicating that the user interface 104 is disconnecting, to inform the attendees of the old virtual meeting 108.

The computer 106 can be programmed to, in response to the user interface 104 being connected to one virtual meeting 108 at the start time of another virtual meeting 108, based on the selection being the second option, transmit a notification to the new virtual meeting 108, e.g., indicating that the occupant is attending another virtual meeting 108, will be late, etc. For example, the computer 106 can transmit the notification to the fourth virtual meeting 108d that the occupant is currently attending the third virtual meeting 108c. The computer 106 can maintain the connection to the old virtual meeting 108, e.g., the third virtual meeting 108c. The computer 106 can connect the user interface 104 to the new virtual meeting 108 upon the occupant entering a command into the user interface 104 to disconnect from the old virtual meeting 108 or the old virtual meeting 108 ending, which may occur after the start time of the new virtual meeting 108. For example, the computer 106 can connect the user interface 104 to the fourth virtual meeting 108d at 1:00 PM upon the ending of the third virtual meeting 108c, after the start time of 12:30 PM of the fourth virtual meeting 108d, as shown in FIG. 3.

The computer 106 can be programmed to, in response to the user interface 104 being connected to one virtual meeting 108 at the start time of another virtual meeting 108, based on the selection being the third option, connect the user interface 104 to the new virtual meeting 108 while remaining connected to the old virtual meeting 108. For example, the screen 116 of the user interface 104 may display the two virtual meetings 108 in a split screen. For another example, the user interface 104 may connect to one of the virtual meetings 108 in a video-only mode and the other of the virtual meetings 108 in an audio-only mode or with both video and audio. The third option can also apply when the two virtual meetings 108 have the same start time.

Figure 4:
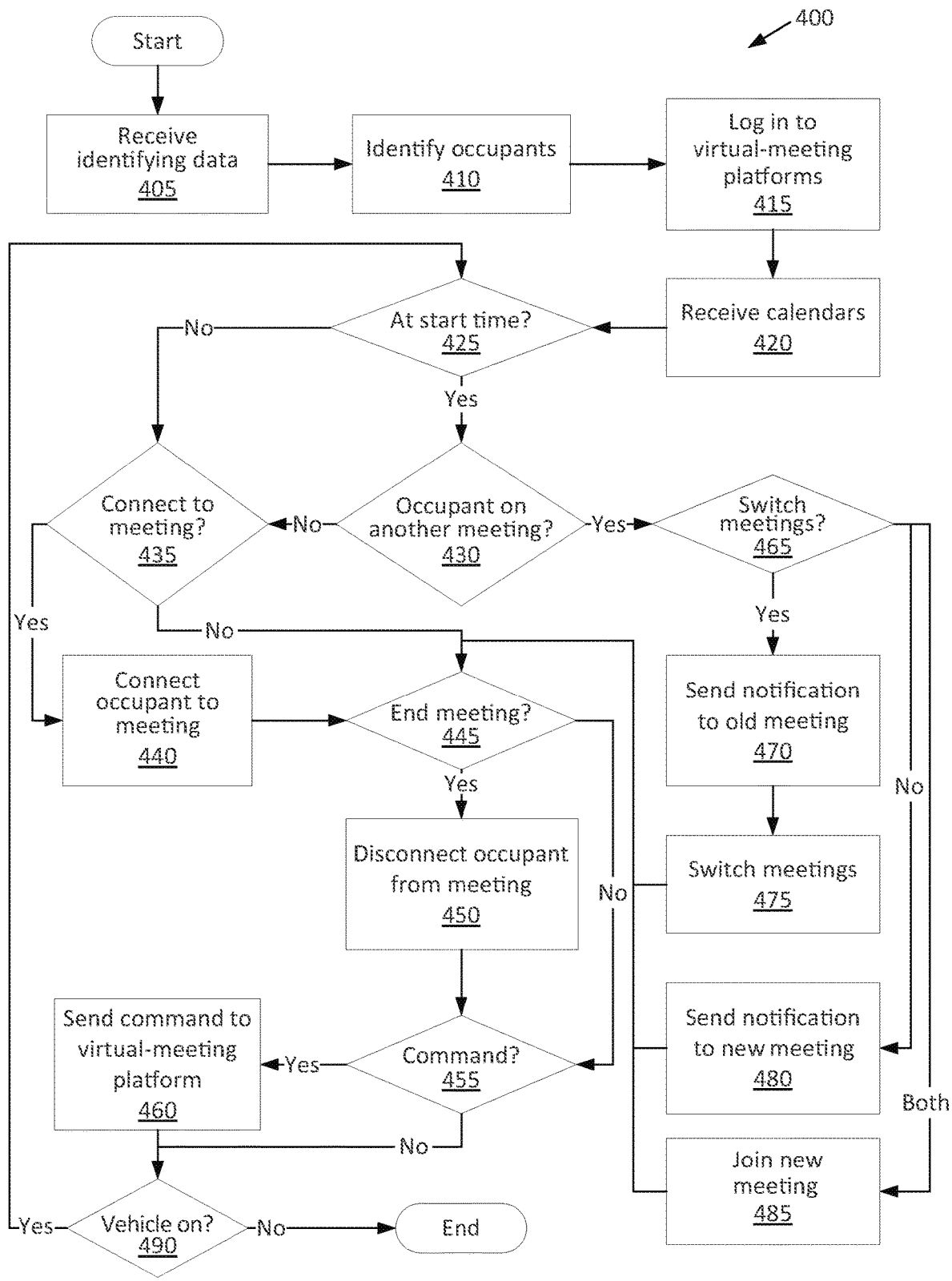
FIG. 4 is a process flow diagram of an example process for controlling the virtual-meeting platforms from the vehicle.

FIG. 4 is a process flow diagram illustrating an exemplary process 400 for controlling the virtual-meeting platforms 110 from the vehicle 100. The memory of the computer 106 stores executable instructions for performing the steps of the process 400 and/or programming can be implemented in structures such as mentioned above. The computer 106 can initiate the process 400 in response to the vehicle 100 starting. As a general overview of the process 400, the computer 106 can receive identifying data from the occupants, identify the occupants, provide identifications of the occupants to the virtual-meeting platforms 110, and receive the calendars 134 for the occupants from the virtual-meeting platforms 110. At a start time of a virtual meeting 108 for an occupant or if the occupant enters a command to start a virtual meeting 108, if that occupant is not attending another virtual meeting 108, the computer 106 connects that occupant's user interface 104 to the virtual meeting 108. If an occupant is in a virtual meeting 108 and that virtual meeting 108 ends or the occupant enters a command to disconnect from that virtual meeting 108, the computer 106 disconnects that occupant from that virtual meeting 108. In response to receiving a command from an occupant for a virtual meeting 108, the computer 106 transmits the command to the virtual-meeting platform 110 hosting that virtual meeting 108. At a start time of a new virtual meeting 108 for an occupant, if that occupant is attending an old virtual meeting 108, the computer 106 either transmits a notification to the old virtual meeting 108, disconnects the user interface 104 from the old virtual meeting 108, and connects the user interface 104 to the new virtual meeting 108 based on the selection of a first option by the occupant; transmits a notification to the new virtual meeting 108 and maintains the connection of the user interface 104 to the old virtual meeting 108 based on the selection of a second option by the occupant; or connects the user interface 104 to the new virtual meeting 108 and maintains the connection of the user interface 104 to the old virtual meeting 108 based on the selection of a third option by the occupant. The process 400 continues for as long as the vehicle 100 remains on.

The process 400 begins in a block 405, in which the computer 106 receives data for identifying the occupants, as described above.

Next, in a block 410, the computer 106 identifies the occupants of the vehicle 100, as described above.

Next, in a block 415, the computer 106 provides identifications of the occupants to the plurality of the virtual-meeting platforms 110, as described above.

Next, in a block 420, the computer 106 receives the calendars 134 of the virtual meetings 108 from the virtual-meeting platforms 110.

Next, in a decision block 425, the computer 106 determines whether any virtual meetings 108 are scheduled to start, e.g., by comparing the start times from the calendars 134 with a current time. If the start time of one of the virtual meetings 108 is the current time, the computer 106 identifies that virtual meeting 108, and the process 400 proceeds to a decision block 430. If none of the start times are the current time, the process 400 proceeds to a decision block 435.

In the decision block 430, the computer 106 determines whether the user interface 104 of the occupant scheduled to appear in the virtual meeting 108 identified in the decision block 425 (the new virtual meeting 108) is currently connected to another virtual meeting 108 (the old virtual meeting 108). If so, the computer 106 identifies that occupant, and the process 400 proceeds to a decision block 465. If not, the process 400 proceeds to the decision block 435.

In the decision block 435, the computer 106 determines whether to connect one of the user interfaces 104 to one of the virtual meetings 108. For example, the computer 106 can connect the user interface 104 to the virtual meeting 108 in response to the start time of the virtual meeting 108 being the current time. For another example, the computer 106 can connect the user interface 104 to an unscheduled virtual meeting 108 in response to a command by the occupant to create the unscheduled virtual meeting 108. If the computer 106 determines to connect one of the user interfaces 104 to a virtual meeting 108, the computer 106 identifies that user interface 104 and that virtual meeting 108, and the process 400 proceeds to a block 440. If not, the process 400 proceeds to a decision block 445.

In the block 440, the computer 106 connects the user interface 104 identified in the decision block 435 to the virtual meeting 108 identified in the decision block 435, as described above. After the block 440, the process 400 proceeds to the decision block 445.

In the decision block 445, the computer 106 determines whether to disconnect one of the user interfaces 104 from a virtual meeting 108 to which that user interface 104 is currently connected. If that virtual meeting 108 ends or if the computer 106 receives a command from that user interface 104 to disconnect from that virtual meeting 108, the computer 106 identifies that user interface 104 and that virtual meeting 108, and the process 400 proceeds to a block 450. If the user interfaces 104 are not currently connected to any virtual meetings 108, or if the ongoing virtual meetings 108 are not currently ending and the computer 106 has not received any commands to disconnect any user interface 104 from any virtual meeting 108, the process 400 proceeds to a decision block 455.

In the block 450, the computer 106 disconnects the user interface 104 identified in the decision block 445 from the virtual meeting 108 identified in the decision block 445, as described above. After the block 450, the process 400 proceeds to the decision block 455.

In the decision block 455, the computer 106 determines whether any occupant has entered a command for one of the virtual-meeting platforms 110 in any of the user interfaces 104. If so, the computer 106 identifies that virtual-meeting platform 110, and the process 400 proceeds to a block 460. If not, the process 400 proceeds to a decision block 490.

In the block 460, the computer 106 transmits the command received in the decision block 455 to the virtual-meeting platform 110 identified in the decision block 455, as described above. After the block 460, the process 400 proceeds to the decision block 490.

In the decision block 465, the computer 106 determines whether the occupant identified in the decision block 430 has selected the first option (switch virtual meetings 108), the second option (stay in the current virtual meeting 108), or the third option (connect to both virtual meetings 108), as described above. In response to receiving the selection of the first option, the process 400 proceeds to a block 470. In response to receiving the selection of the second option, the process 400 proceeds to a block 480. In response to receiving the selection of the third option, the process 400 proceeds to a block 485.

In the block 470, the computer 106 transmits a notification to the virtual meeting 108 that the occupant identified in the decision block 430 is currently attending (the old virtual meeting 108), as described above.

Next, in a block 475, the computer 106 disconnects the user interface 104 associated with the occupant identified in the decision block 430 from the old virtual meeting 108, and the computer 106 connects that user interface 104 to the new virtual meeting 108, as described above. After the block 475, the process 400 proceeds to the decision block 445.

In the block 480, the computer 106 transmits a notification to the new virtual meeting 108, and the computer 106 maintains the connection of the user interface 104 of the occupant identified in the decision block 430 with the old virtual meeting 108, i.e., the virtual meeting 108 to which that user interface 104 is currently connected, as described above. After the block 480, the process 400 proceeds to the decision block 445.

In the block 485, the computer 106 connects the user interface 104 to the new virtual meeting 108, and the computer 106 maintains the connection of the user interface 104 of the occupant identified in the decision block 430 with the old virtual meeting 108, i.e., the virtual meeting 108 to which that user interface 104 is currently connected, as described above. After the block 485, the process 400 proceeds to the decision block 445.

In the decision block 490, the computer 106 determines whether the vehicle 100 is still on. If so, the process 400 returns to the decision block 425 to continue managing the virtual meetings 108 of the occupants. If not, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," and "fourth" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
provide an identification of an occupant of a vehicle to a plurality of virtual-meeting platforms, the virtual-meeting platforms being distinct services;
receive data indicating a plurality of virtual meetings at respective start times for the occupant from the virtual-meeting platforms;
connect a user interface of the vehicle to a first one of the virtual meetings through a first virtual-meeting platform of the virtual meeting platforms at the respective start time; and
connect the user interface to a second one of the virtual meetings through a second virtual-meeting platform of the virtual meeting platforms at the respective start time.

2. The computer of claim 1, wherein
the occupant is a first occupant;
the identification is a first identification; and
the instructions further include instructions to identify a second occupant of the vehicle and provide a second identification of the second occupant to the virtual-meeting platforms.

3. The computer of claim 2, wherein
the virtual meetings are first virtual meetings;
the start times are first start times; and
the instructions further include instructions to receive data indicating a plurality of second virtual meetings at respective second start times for the occupant from the virtual-meeting platforms.

4. The computer of claim 3, wherein the user interface is a first user interface, and the instructions include instructions to:
connect a second user interface of the vehicle to a first one of the second virtual meetings through the first virtual-meeting platform at the respective second start time; and
connect the second user interface to a second one of the second virtual meetings through the second virtual-meeting platform at the respective second start time.

5. The computer of claim 4, wherein the first one of the first virtual meetings and the first one of the second virtual meetings are different.

6. The computer of claim 5, wherein a first scheduled interval of the first one of the first virtual meetings overlaps a second scheduled interval of the first one of the second virtual meetings.

7. The computer of claim 4, wherein the first one of the first virtual meetings and the first one of the second virtual meetings are the same.

8. The computer of claim 7, wherein the instructions further include instructions to:
upon connecting the first user interface to the first one of the first virtual meetings, provide a first session identifier of the first user interface for the first one of the first virtual meetings; and
upon connecting the second user interface to the first one of the second virtual meetings, provide a second session identifier of the second user interface for the first one of the second virtual meetings;
wherein the first and second session identifiers are different.

9. The computer of claim 1, wherein the instructions further include instructions to, in response to the user interface being connected to the first one of the virtual meetings at the start time of a third one of the virtual meetings, disconnect the user interface from the first one of the virtual meetings, and then connect the user interface to the third one of the virtual meetings.

10. The computer of claim 1, wherein the instructions further include instructions to, in response to the user interface being connected to the first one of the virtual meetings at the start time of a third one of the virtual meetings, transmit a notification to the third one of the virtual meetings.

11. The computer of claim 1, wherein the instructions further include instructions to:
receive a selection of a first option or a second option;
in response to the user interface being connected to the first one of the virtual meetings at the start time of a third one of the virtual meetings, based on the selection being the first option, disconnect the user interface from the first one of the virtual meetings, and then connect the user interface to the third one of the virtual meetings; and
in response to the user interface being connected to the first one of the virtual meetings at the start time of the third one of the virtual meetings, based on the selection being the second option, transmit a notification to the third one of the virtual meetings.

12. A system comprising:
a user interface of a vehicle; and
a computer communicatively coupled to the user interface;
wherein the computer is programmed to:
provide an identification of an occupant of the vehicle to a plurality of virtual-meeting platforms, the virtual-meeting platforms being distinct services;
receive data indicating a plurality of virtual meetings at respective start times for the occupant from the virtual-meeting platforms;
connect the user interface to a first one of the virtual meetings through a first virtual-meeting platform of the virtual meeting platforms at the respective start time; and
connect the user interface to a second one of the virtual meetings through a second virtual-meeting platform of the virtual meeting platforms at the respective start time.

13. The system of claim 12, wherein the user interface includes a microphone and a speaker.

14. The system of claim 12, wherein the user interface includes an audio jack.

15. The system of claim 12, wherein the user interface includes a camera.

16. The system of claim 12, wherein the user interface includes a mobile connection connectable to a mobile device of the occupant.

17. The system of claim 12, wherein the user interface is a first user interface, the occupant is a first occupant, and the identification is a first identification, the system further comprising a second user interface, wherein the computer is further programmed to identify a second occupant of the vehicle and provide a second identification of the second occupant to the virtual-meeting platforms, and the second user interface is associated with the second occupant.

18. The system of claim 17, wherein the first user interface includes a first microphone and a first speaker, and the second user interface includes a second microphone and a second speaker.

19. The system of claim 17, wherein the first user interface is arranged for the first occupant to be in a front seat of the vehicle, and the second user interface is arranged for the second occupant to be in a rear seat of the vehicle.

20. A method comprising:
providing an identification of an occupant of a vehicle to a plurality of virtual-meeting platforms, the virtual-meeting platforms being distinct services;
receiving data indicating a plurality of virtual meetings at respective start times for the occupant from the virtual-meeting platforms;
connecting a user interface of the vehicle to a first one of the virtual meetings through a first virtual-meeting platform of the virtual meeting platforms at the respective start time; and
connecting the user interface to a second one of the virtual meetings through a second virtual-meeting platform of the virtual meeting platforms at the respective start time.

* * * * *